(12) United States Patent
Seol et al.

(10) Patent No.: US 10,214,000 B2
(45) Date of Patent: Feb. 26, 2019

(54) METHOD AND APPARATUS FOR APPLYING FILM

(71) Applicant: Corning Precision Materials Co., Ltd., Chungcheongnam-do (KR)

(72) Inventors: Mun Hwan Seol, Chungcheongnam-do (KR); Ki Nam Kim, Chungcheongnam-do (KR); Shin Kim, Chungcheongnam-do (KR); Dong Young Cho, Chungcheongnam-do (KR)

(73) Assignee: Corning Precision Materials Co., Ltd. (KR)

( * ) Notice: Subject to any disclaimer, the term of this patent is extended or adjusted under 35 U.S.C. 154(b) by 121 days.

(21) Appl. No.: 15/109,314

(22) PCT Filed: Dec. 29, 2014

(86) PCT No.: PCT/KR2014/012977
§ 371 (c)(1),
(2) Date: Jun. 30, 2016

(87) PCT Pub. No.: WO2015/102340
PCT Pub. Date: Jul. 9, 2015

(65) Prior Publication Data
US 2016/0325538 A1    Nov. 10, 2016

(30) Foreign Application Priority Data
Dec. 30, 2013  (KR) .................. 10-2013-0167234

(51) Int. Cl.
*B32B 37/00* (2006.01)
*B32B 37/10* (2006.01)
*B32B 37/22* (2006.01)

(52) U.S. Cl.
CPC .......... *B32B 37/10* (2013.01); *B32B 37/0053* (2013.01); *B32B 37/223* (2013.01);
(Continued)

(58) Field of Classification Search
CPC ..... B29C 65/08; B32B 37/10; B32B 37/0053; B32B 37/223; B65B 51/225
(Continued)

(56) References Cited

U.S. PATENT DOCUMENTS

| 4,938,404 A | 7/1990 | Helms et al. |
| 6,782,935 B2 * | 8/2004 | Lin .................. B32B 37/0053 100/210 |

(Continued)

FOREIGN PATENT DOCUMENTS

| EP | 2226254 A1 | 9/2010 |
| JP | 2001253605 A | 9/2001 |

OTHER PUBLICATIONS

International Search Report for Application No. PCT/KR2014/012977 dated Apr. 23, 2015.

*Primary Examiner* — James D Sells
(74) *Attorney, Agent, or Firm* — Lerner, David, Littenberg, Krumholz & Mentlik, LLP

(57) ABSTRACT

The present invention provides a method for applying a film in which non-contact repulsive forces generated by ultrasonic vibration are applied using an ultrasonic vibration unit (A) to a surface of a substrate so as to support the surface of the substrate without contact, and a film is pressed and applied to the other surface of the substrate using a pressing roller. The ultrasonic vibration unit (A) may comprise: an ultrasonic vibration body facing a surface of the substrate; and an ultrasonic excitement unit for exciting the ultrasonic vibration body. In addition, the present invention provides an apparatus for applying a film comprising: an ultrasonic vibration unit (A) for applying non-contact repulsive forces generated by the ultrasonic vibration to a surface of a substrate so as to support the surface of the substrate without (Continued)

contact; and a pressing roller for pressing and applying a film to the other surface of the substrate.

14 Claims, 15 Drawing Sheets

(52) U.S. Cl.
CPC ..... *B32B 2309/12* (2013.01); *B32B 2310/028* (2013.01); *B32B 2315/08* (2013.01)

(58) Field of Classification Search
USPC ........................................................ 156/73.1
See application file for complete search history.

(56) References Cited

U.S. PATENT DOCUMENTS

| | | | |
|---|---|---|---|
| 8,297,095 | B2 | 10/2012 | Wagner |
| 2004/0188023 | A1* | 9/2004 | Sasaki .................. B32B 37/182 |
| | | | 156/359 |
| 2005/0103426 | A1* | 5/2005 | Chick ............... B32B 17/10036 |
| | | | 156/106 |
| 2007/0137762 | A1* | 6/2007 | Topolkaraev ......... B29C 65/087 |
| | | | 156/73.1 |
| 2010/0215923 | A1* | 8/2010 | Frost ....................... B32B 27/32 |
| | | | 428/196 |
| 2011/0011704 | A1* | 1/2011 | Isobe ..................... B65G 37/00 |
| | | | 198/752.1 |
| 2011/0311320 | A1* | 12/2011 | Schilp ................... B65G 54/00 |
| | | | 406/86 |

\* cited by examiner

FPR = Pressure Roller Force
FPR = F1 + F2

US 10,214,000 B2

METHOD AND APPARATUS FOR APPLYING FILM

CROSS-REFERENCE TO RELATED APPLICATION

This application is a national phase entry under 35 U.S.C. § 371 of International Application No. PCT/KR2014/012977, filed Dec. 29, 2014, published in Korean, which claims priority to Korean Patent Application No. 10-2013-0167234, filed on Dec. 30, 2013, the disclosures of which are incorporated herein by reference.

BACKGROUND OF THE INVENTION

Field of the Invention

The present invention relates to a film lamination method and apparatus, and more particularly, to a film lamination method and apparatus able to support one surface of a substrate without contact and simultaneously laminate the other surface of the substrate with a film.

Description of Related Art

In some cases, the surface of a substrate is laminated with a film for some reason. For example, one surface of the substrate is laminated with a protective film in order to prevent the substrate surface from scratches or stains, or is laminated with a functional film for a special use.

FIG. 1 schematically illustrates a method of laminating both surfaces of a substrate S with films F in the related art.

As illustrated in FIG. 1, although only one surface of the substrate S is required to be laminated with a film F, both surfaces of the substrate S are laminated with a film F in order to prevent the other surface of the substrate S from being damaged. The films F are unnecessarily used on the both surfaces of the substrate S, thereby increasing consumable costs, which is problematic.

FIG. 2 and FIG. 3 illustrate a method of laminating one surface of a substrate S with a film F in the related art.

When the surface quality of a substrate S is relatively less important, one surface (a B-side surface) of the substrate S is laminated with a film F by pressing the film F against the B-side surface of the substrate S using a pressure roller, and the other surface (an A-side surface) of the substrate S is supported on rollers formed of a soft material (e.g. silicone) by bringing the A-side surface of the substrate S into contact with the soft rollers. However, as the line is continuously used, the soft rollers are stained and damaged, thereby causing the A-side surface of the substrate S to suffer from damages, such as scratches or stains, as mentioned above.

FIG. 4 illustrates another method of laminating one surface of a substrate S with a film F in the related art.

The surface of an A-side pressure roller 10a that comes into contact with a substrate S is kept clean through rolling-contact with a sticky roller 10c. However, in this case, a sticky material from the sticky roller 10c may be transferred to the surface of the substrate S through the pressure roller 10a, thereby causing defects such as stains. Unexplained reference numeral 10b indicates another pressure roller.

FIG. 5 illustrates a further method of laminating one surface of a substrate S with a film F in the related art.

This method is similar to the related-art film lamination method illustrate in FIG. 1, except that the film F attached to the A-side surface of the substrate S is detached therefrom. In this case, however, an adhesive material from the film F is transferred to the surface of the substrate S, thereby staining the substrate S, which is problematic. In addition, the continuous use of the film F to be detached causes an increase in manufacturing costs, which is problematic.

In the meantime, a technology for supporting the A-side surface of the substrate S without contact by combining a non-contact technology such as air floating was proposed. In this case, however, excessive utility costs are incurred. In addition, when a predetermined amount of pressure is applied in order to bond the film F to the substrate S, the air may not have a sufficient amount of repelling force, which frequently leads to the problem in that the substrate S comes into contact with the roller. Furthermore, the surface of the substrate S may be stained by the air.

The information disclosed in the Background of the Invention section is provided only for better understanding of the background of the invention and should not be taken as an acknowledgment or any form of suggestion that this information forms a prior art that would already be known to a person skilled in the art.

BRIEF SUMMARY OF THE INVENTION

Various aspects of the present invention provide a film lamination method and apparatus able to reliably laminate one surface of a substrate with a film while preventing both surfaces of the substrate from damages such as scratches or stains.

In an aspect of the present invention, provided is a film lamination method including: supporting one surface of a substrate without contact by generating ultrasonic vibrations from an ultrasonic vibration unit and applying repelling force induced from the ultrasonic vibrations onto the one surface of the substrate; and simultaneously laminating the other surface of the substrate with a film by pressing the film against the other surface of the substrate using a pressure roller.

The ultrasonic vibration unit may include a first ultrasonic vibration part disposed upstream of the pressure roller and a second ultrasonic vibration part disposed downstream of the pressure roller.

In another aspect of the present invention, provided is a film lamination apparatus including: an ultrasonic vibration unit supporting one surface of a substrate without contact by applying repelling force induced from ultrasonic vibrations onto the one surface of the substrate; and a pressure roller laminating the other surface of the substrate with a film by pressing the film against the other surface of the substrate.

According to the present invention as set forth above, it is possible to reliably laminate one surface of a substrate with a film while preventing both surfaces of the substrate from damages such as scratches or stains. It is therefore possible to half the use of consumables while allowing the substrate to have superior surface quality, thereby increasing the cost competitiveness of products.

The methods and apparatuses of the present invention have other features and advantages that will be apparent from or are set forth in greater detail in the accompanying drawings which are incorporated herein, and in the following Detailed Description of the Invention, which together serve to explain certain principles of the present invention.

DETAILED DESCRIPTION OF THE INVENTION

Figure 1:
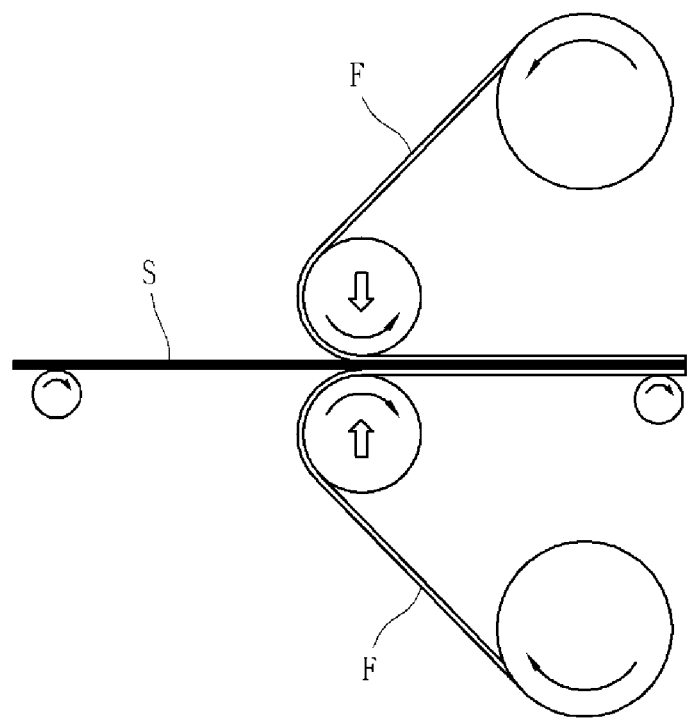
FIG. 1 schematically illustrates a method of laminating either surface of a substrate with a film in the related art.
Figure 2:
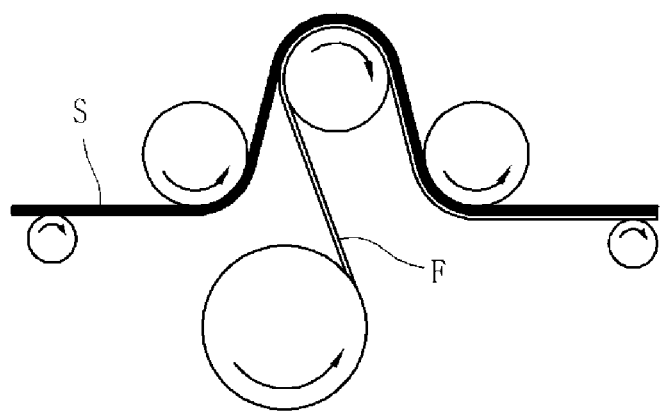
FIG. 2 and FIG. 3 illustrate a method of laminating one surface of a substrate with a film in the related art.
Figure 3:
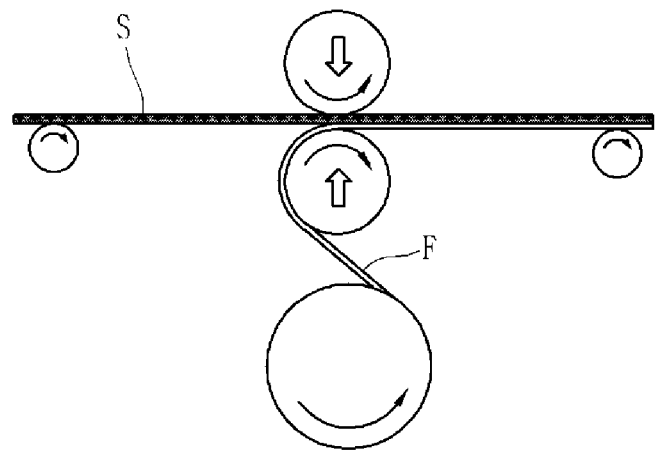
Figure 4:
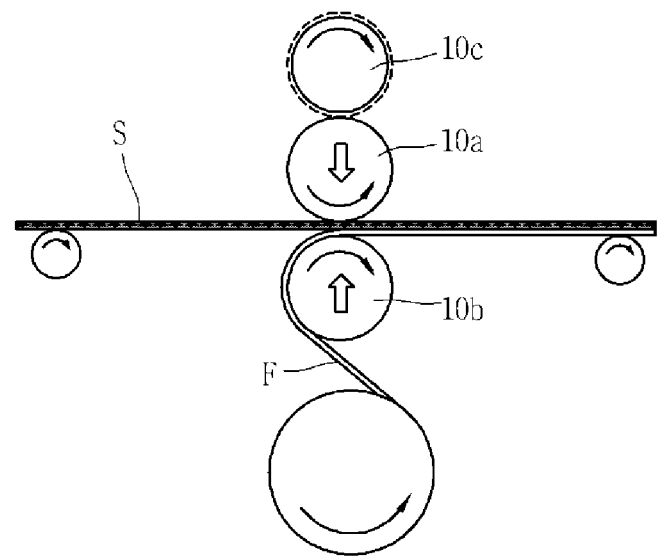
FIG. 4 illustrates another method of laminating one surface of a substrate with a film in the related art.
Figure 5:
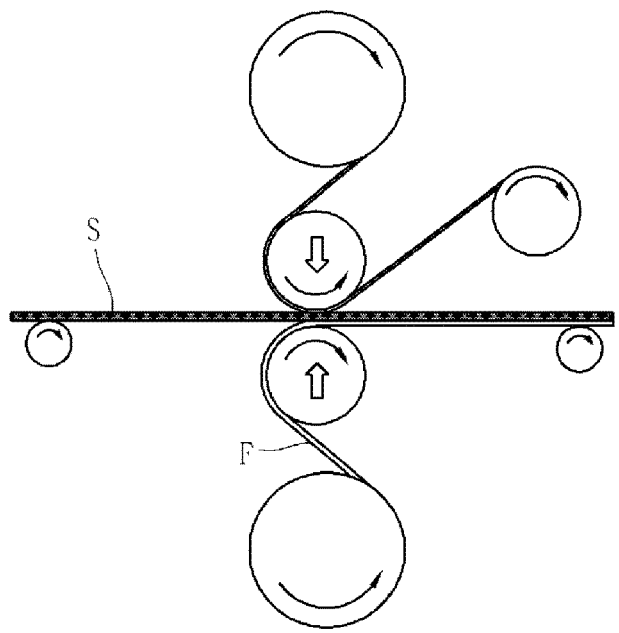
FIG. 5 illustrates a further method of laminating one surface of a substrate with a film in the related art.

Reference will now be made in detail to exemplary embodiments of the present invention in conjunction with the accompanying drawings so that a person skilled in the art to which the present invention relates could easily put the present invention into practice.

Throughout this document, reference should be made to the drawings, in which the same reference numerals and symbols are used throughout the different drawings to designate the same or similar components. In the following description of the present invention, detailed descriptions of known functions and components incorporated herein will be omitted in the case that the subject matter of the present invention is rendered unclear.

Figure 6:
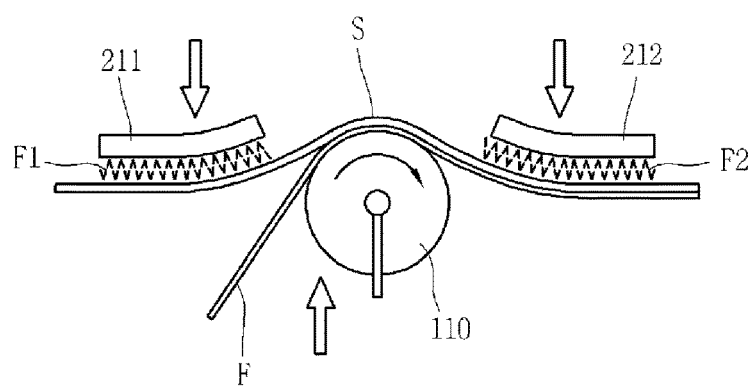
FIG. 6 schematically illustrates a first exemplary embodiment of a film lamination method according to the present invention.
Figure 6:
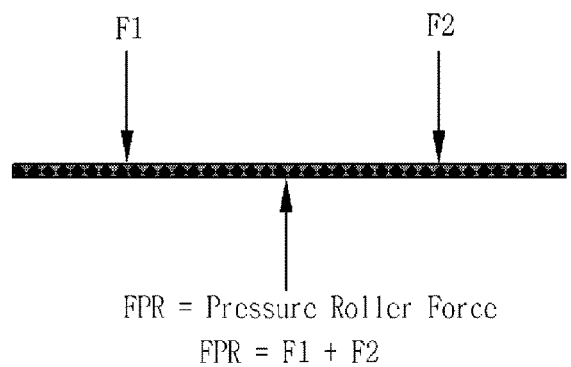

FIG. 6 schematically illustrates a first exemplary embodiment of a film lamination method according to the present invention.

Herein, a substrate S to be laminated with a film F may be a glass substrate. The substrate S may also be formed of a flexible material or a hard material. The film lamination method illustrated in FIG. 6 may be used for the substrate S formed of a flexible material, whereas a film lamination method illustrated in FIG. 16 may be used for the substrate S formed of a hard material.

When the substrate S is a thin glass substrate (having a thickness of 0.2 mm or less), the film lamination method may be implemented as a continuous process since the substrate S is flexible. Such a flexible substrate continuous in the lengthwise direction is referred to as a web. The web may be subjected to other continuous processes, such as machining and printing, in addition to the film lamination method according to the present invention.

The film lamination apparatus illustrated in FIG. 6 includes an (A-side or first) ultrasonic vibration unit and a (B-side) pressure roller.

The ultrasonic vibration unit generates ultrasonic vibrations. The ultrasonic vibration unit employs an ultrasonic vibration technology (Korean Patent Application Publication No. 10-2010-0057530). The ultrasonic vibration unit supports one surface (A-side surface) of the substrate S without contact by applying non-contact repelling force induced from the ultrasonic vibrations to the one surface of the substrate S. The ultrasonic vibration unit includes a first ultrasonic vibration part 211 disposed upstream of the pressure roller 110 and a second ultrasonic vibration part 212 disposed downstream of the pressure roller 110. Herein, the terms "upstream" and "downstream" are based on a path along which the substrate S is transported.

The pressure roller 110 laminates the other surface (B-side surface) of the substrate S with a film F by pressing the film F against the other surface. The pressure roller 110 applies a pressure to the substrate S laminated with the film F such that one surface of the substrate S has a positive curvature (and thus the other surface of the substrate S has a negative curvature). At least one portion of the surface of the ultrasonic vibration parts 211, 212 facing the substrate S is a curved surface, the curvature of which corresponds to the positive curvature of one surface of the substrate S.

The contact pressure force (FPR: Force from Pressure Roller) from the pressure roller 110 and non-contact repelling force (holding force) F1 and F2 from the ultrasonic vibration parts 211, 212 are applied to both surfaces of the substrate S in a balanced state. In order to prevent a brittle material such as thin glass, the pressure roller 110 and the ultrasonic vibration parts 211, 212 are configured to smoothly press the substrate S. In addition, the amount of the contact pressure force FPR of the pressure roller 110 and the amount of the non-contact repelling force of the ultrasonic vibration parts 211, 212 may be adjusted in a corresponding manner.

Table 1 below presents the results obtained by comparing the film lamination method of the present invention with the film lamination methods of the related art.

TABLE 1

|  | Roller & roller | Roller & sticky roller | Film lamination & delamination | Roller & ultrasonic vibration unit (the present invention) |
|---|---|---|---|---|
| Contact with A-side surface | Roller | Roller | Film | None |
| Scratch | High | Medium | Low | None |
| Stain | High | Medium (transfer of adhesive | Low | None |

TABLE 1-continued

|  | Roller & roller | Roller & sticky roller | Film lamination & delamination | Roller & ultrasonic vibration unit (the present invention) |
|---|---|---|---|---|
| Cost | None | component) Medium | High | None |
| Conclusion | Bad | Average | Good | Excellent |

As apparent from Table 1 above, the film lamination method according to the present invention does not create scratches on the A-side surface of the substrate S that is not laminated with a film F since the A-side surface is not subjected to any mechanical contact. In addition, no stain is created since neither the adhesive tape nor the film is used. Furthermore, it is an advantageous in that there is no cost for consumables. Since a film F is interposed between the B-side surface of the substrate S and the pressure roller 110, no damage is caused to the B-side surface of the substrate S.

Although not shown, it is preferable that the substrate S is unwound from an unwinding roll, is laminated with the film F, and subsequently is wound on a winding roll (roll-to-roll process).

Figure 7:
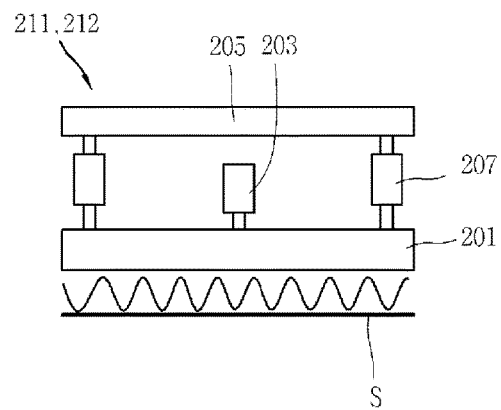
FIG. 7 schematically illustrates the ultrasonic vibration unit shown in FIG. 6.

FIG. 7 schematically illustrates one of the ultrasonic vibration parts 211, 212 shown in FIG. 6.

The ultrasonic vibration part 211, 212 includes an ultrasonic vibrator 201 (e.g. an ultrasonic vibration table) facing one surface of the substrate S and an ultrasonic wave generator 203 for vibrating the ultrasonic vibrator. The ultrasonic vibration part 211, 212 further includes a frame 205 supporting the ultrasonic vibrator 201. The ultrasonic vibration part 211, 212 further include vibration absorbers 207 disposed between the ultrasonic vibrator 201 and the frame 205 to block the transfer of vibrations from the ultrasonic vibrator 201 to the frame 205. Ultrasonic vibrations create an air layer having a predetermined amount of pressure on the surface of the ultrasonic vibrator 201. The air layer forms repelling force that reliably pushes the substrate S without any mechanical contact, thereby preventing the substrate surface from being damaged.

Figure 8:
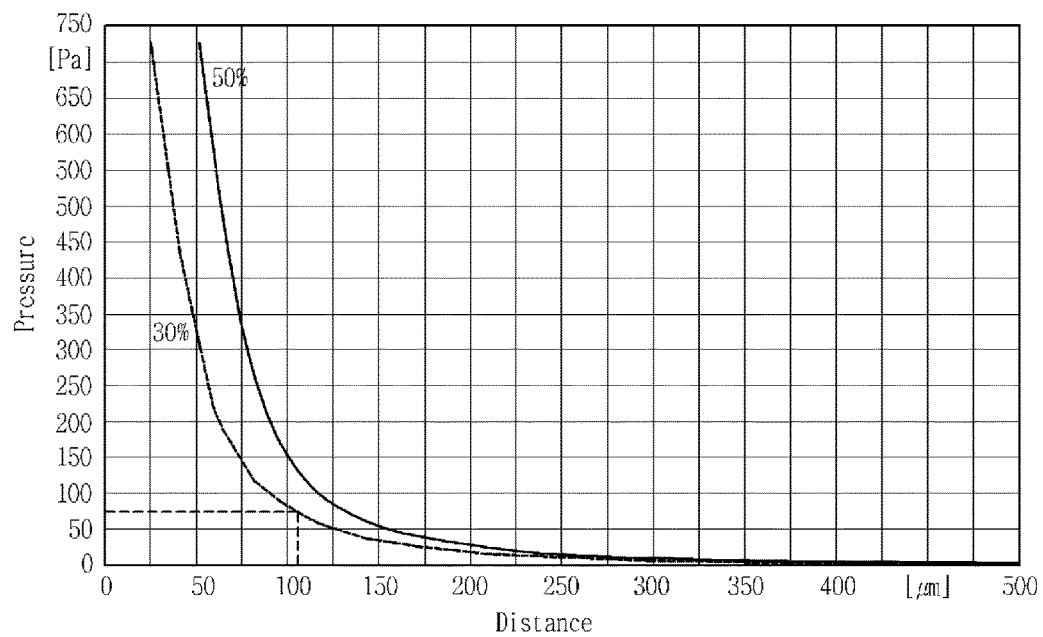
FIG. 8 is a graph illustrating the relationship between the distance from the ultrasonic vibration unit to the substrate and the repelling force.

FIG. 8 is a graph illustrating the relationship between the distance from the ultrasonic vibration parts 211, 212 to the substrate S and the repelling force.

The smaller the distance between the ultrasonic vibration parts 211, 212 and the substrate S is, the greater the pressure of the air layer becomes. It is therefore possible to create a predetermined amount of pressure by which the substrate S can be laminated with a film F while the distance between the pressure roller 110 and the ultrasonic vibration parts 211, 212 is reduced. The high pressure of the air layer can prevent the substrate S from coming into contact with the ultrasonic vibration parts 211, 212.

Figure 9:
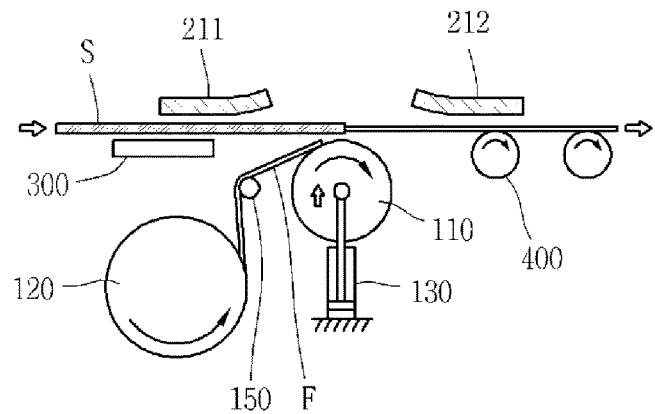
FIG. 9 to FIG. 11 schematically illustrate a second exemplary embodiment of the film lamination method according to the present invention.
Figure 10:
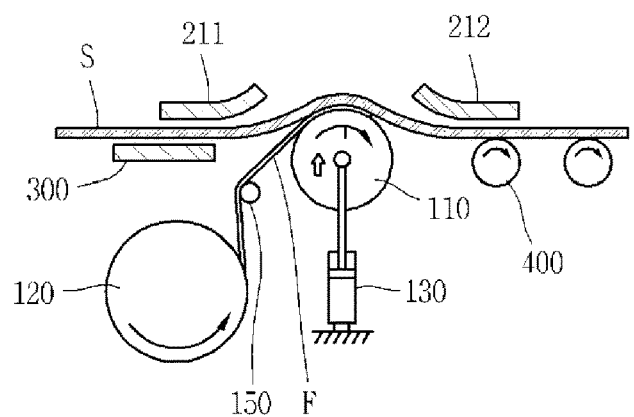
Figure 11:
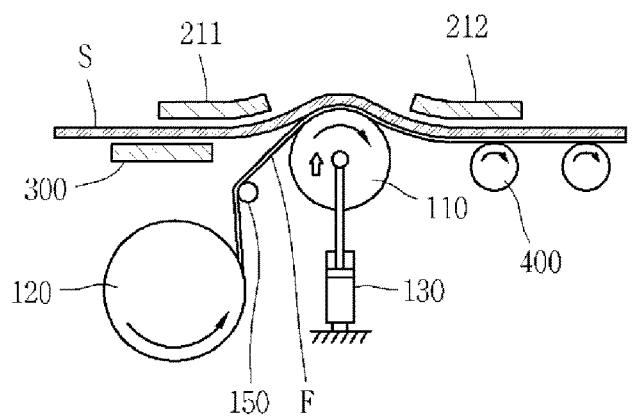

FIG. 9 to FIG. 11 schematically illustrate a film attachment process of a second exemplary embodiment of the film lamination method according to the present invention.

A film lamination apparatus employed in this exemplary embodiment further includes an (B-side or second) ultrasonic vibration unit 300, transportation rollers 400, an unwinding roll 120 and a force applying unit 130 for applying a constant force disposed on the B side, in addition to the ultrasonic vibration parts 211, 212 disposed on the A side and the pressure roller 110 disposed on the B side.

The B-side ultrasonic vibration unit 300 is disposed upstream of the pressure roller 110. The film lamination apparatus generates ultrasonic vibrations using the B-side ultrasonic vibration unit 300 and applies non-contact repelling force induced from the ultrasonic vibrations to the other surface (B-side surface) of the substrate S, thereby supporting the other surface of the substrate S without contact.

The transportation rollers 400 are disposed downstream of the pressure roller 110. The transportation rollers 400 transport the substrate S through contact with the film F attached to the other surface of the substrate S.

The unwinding roll 120 disposed on the B side supplies the film F to the other surface (B-side surface) of the substrate S by unwinding the film F therefrom.

The force applying unit 130 applies a constant force to the pressure roller 110 in the direction toward the substrate S, such that a constant amount of contact pressure force is applied to the film F and the substrate S. Although the force applying unit 130 is illustrated as a cylinder in FIG. 9 to FIG. 11, this is not intended to be limiting. A variety of alternative forms, such as a weight or a spring, may be used.

Referring to the film lamination method, as illustrated in FIG. 9, the substrate S and the film F are transported or supplied to a position where the substrate S is laminated with the film F. Afterwards, as illustrated in FIG. 10, the pressure roller 110 is lifted upwards to apply pressure to the film F and the substrate S. Subsequently, as illustrated in FIG. 11, the film lamination method is carried out continuously by transporting the substrate S and the film F in the pressed state.

Figure 12:
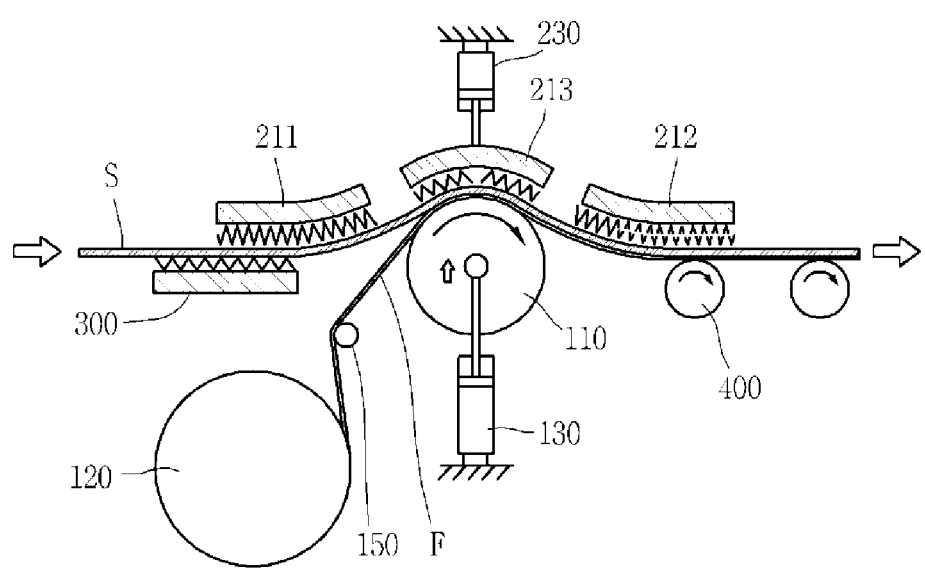
FIG. 12 schematically illustrates a third exemplary embodiment of the film lamination method according to the present invention.

FIG. 12 schematically illustrates a third exemplary embodiment of the film lamination method according to the present invention.

The A-side ultrasonic vibration unit further includes a third ultrasonic vibration part 213 disposed on the A side. The third ultrasonic vibration part 213 is disposed at a position facing the pressure roller 110 such that the substrate S is positioned between the third ultrasonic vibration part 213 and the pressure roller 110. A force applying unit 230 is disposed on the A-side to apply a constant force to the third ultrasonic vibration part 213 in the direction toward the substrate S.

The film lamination apparatus further includes a dancer roller 150 for adjusting the tension of the film F.

Figure 13:
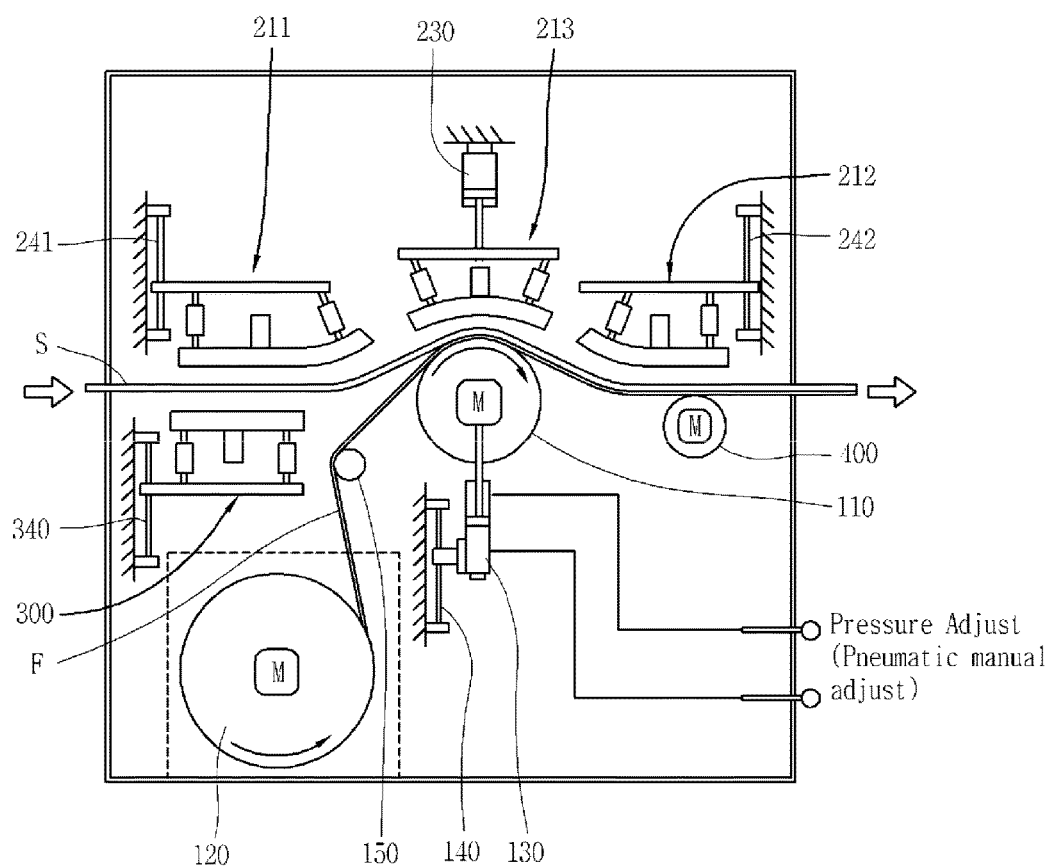
FIG. 13 schematically illustrates a fourth exemplary embodiment of the film lamination method according to the present invention.

FIG. 13 schematically illustrates a fourth exemplary embodiment of the film lamination method according to the present invention.

The film lamination apparatus illustrated in FIG. 13 includes a positioning device 140 for the force applying unit 130 and the positioning devices 241, 242, 340 positioning for the ultrasonic vibration parts 211, 212, and the ultrasonic vibration unit 300. The position of the force applying unit 130 can be adjusted using the positioning device 140 for the force applying unit. The position of the ultrasonic vibration parts 212, 212, and the ultrasonic vibration unit 300 can be adjusted using the positioning device 241, 242, 340 for the ultrasonic vibration parts 212, 212, and the ultrasonic vibration unit 300.

In addition, the film F may be cut using a cutting device provided upstream of the pressure roller 110 on the path along which the film F is supplied. Another cutting device may also be disposed at a position facing the pressure roller 110 in order to cut the front and end portions of the film F.

Figure 14:
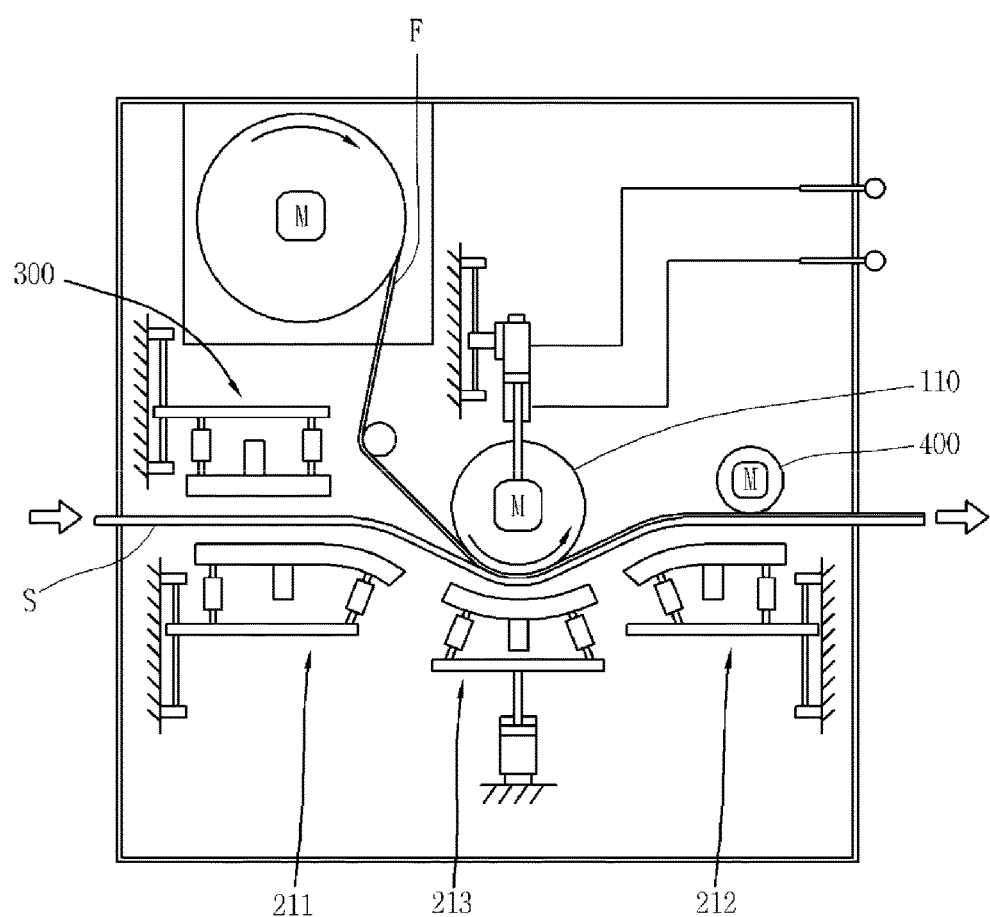
FIG. 14 schematically illustrates a fifth exemplary embodiment of the film lamination method according to the present invention.
Figure 15:
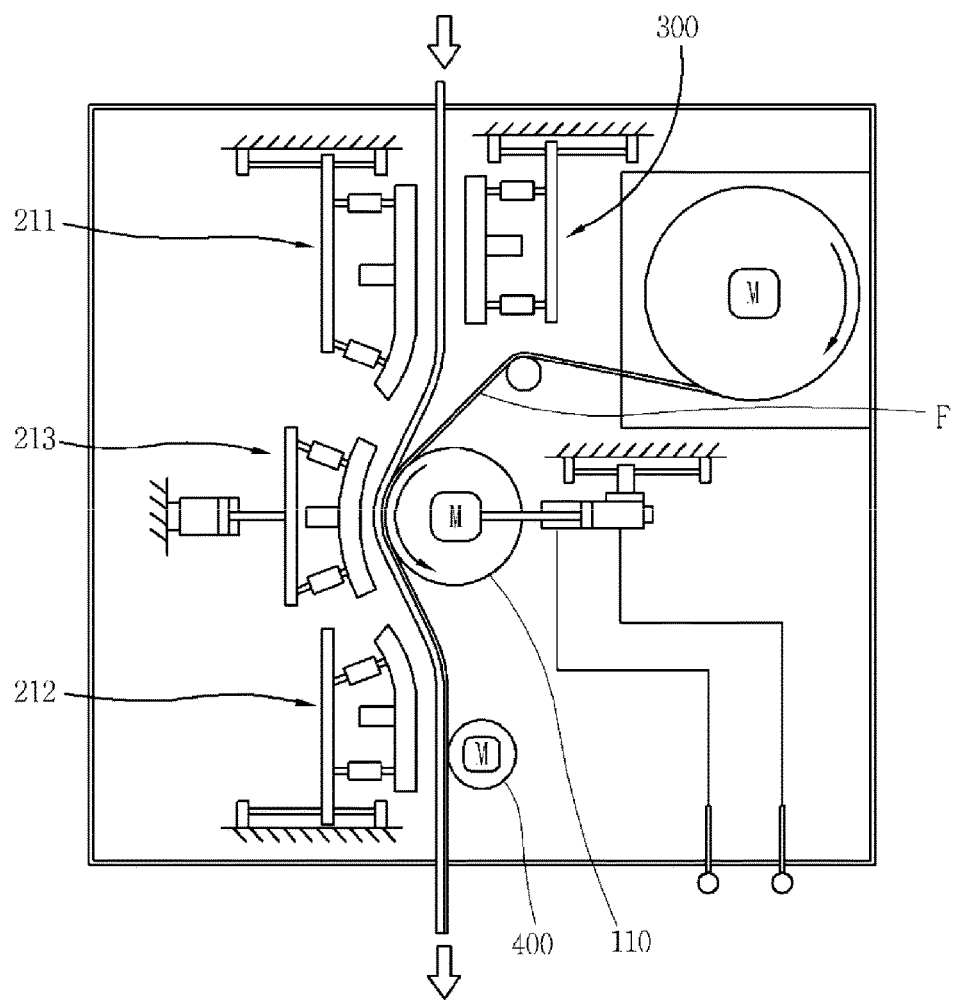
FIG. 15 schematically illustrates a sixth exemplary embodiment of the film lamination method according to the present invention.

FIG. 14 schematically illustrates a fifth exemplary embodiment of the film lamination method according to the present invention, and FIG. 15 schematically illustrates a sixth exemplary embodiment of the film lamination method according to the present invention.

As illustrated in FIG. 14 and FIG. 15, it is possible to design the film lamination method such that a film F can be attached to a variety of portions of a substrate S, such as a horizontal surface, a vertical surface, an upper surface, a lower surface, a left surface or a right surface.

Figure 16:
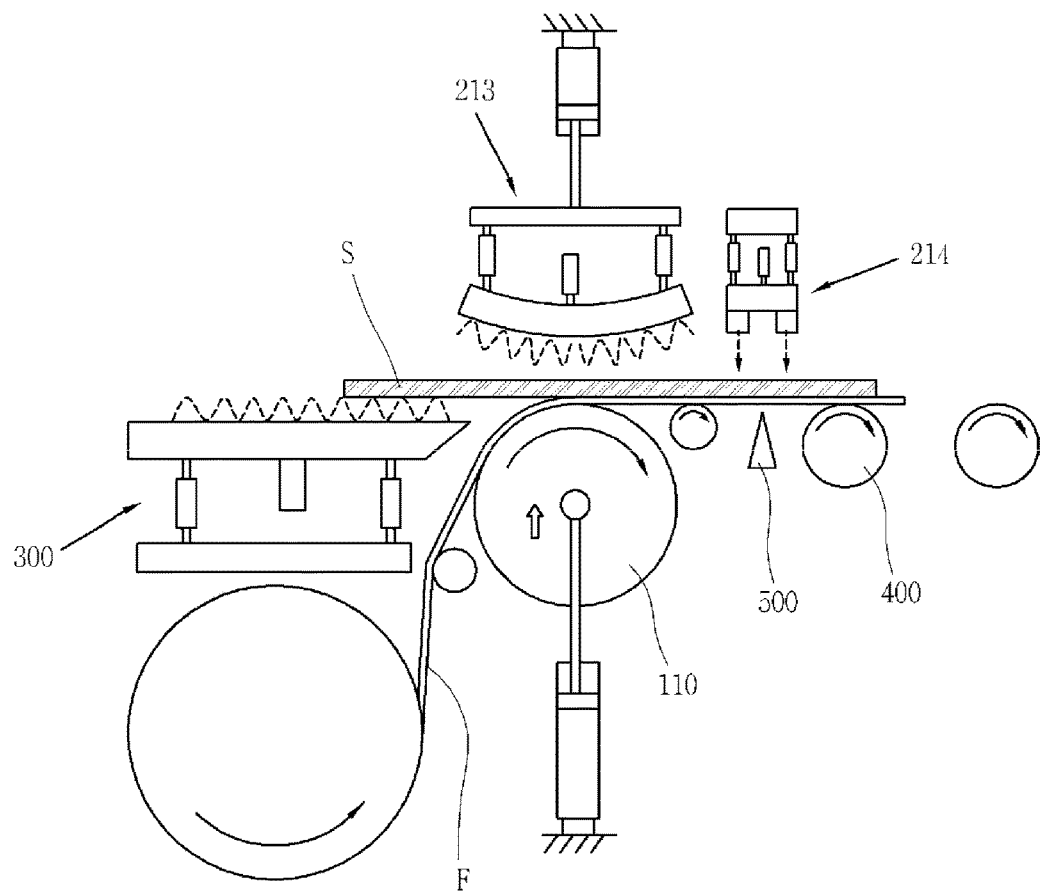
FIG. 16 schematically illustrates a seventh exemplary embodiment of the film lamination method according to the present invention.

FIG. 16 schematically illustrates a seventh exemplary embodiment of the film lamination method according to the present invention, in which a (non-continuous) single substrate S formed of a hard material is laminated with a film F.

The film lamination apparatus includes a cutting device 500 for cutting the film F. The cutting device 500 is disposed at a position downstream of the pressure roller 110, facing the other surface of the substrate S. The ultrasonic vibration unit at the A-side includes a fourth ultrasonic vibration part 214 disposed on the A side, at a position facing the cutting device 500 such that the substrate S is positioned between the fourth ultrasonic vibration part 214 on the A side and the cutting device 500 on the B side. The fourth ultrasonic vibration part 214 facing the cutting device 500 serves to prevent the film F from being dislodged from its position.

Figure 17:
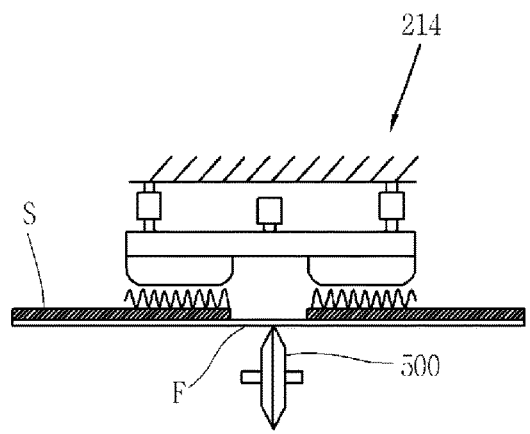
FIG. 17 schematically illustrates a film cutting process in the method shown in FIG. 16, in which a film is cut at a position between two single substrates.

FIG. 17 schematically illustrates a film cutting process in the method shown in FIG. 16, in which a film F is cut at a position between two single substrates S. The film F is cut using the cutting device 500 at the position between the two single substrates S.

FIG. 18 to FIG. 22 schematically illustrate an eighth exemplary embodiment of the film lamination method according to the present invention.

Figure 18:
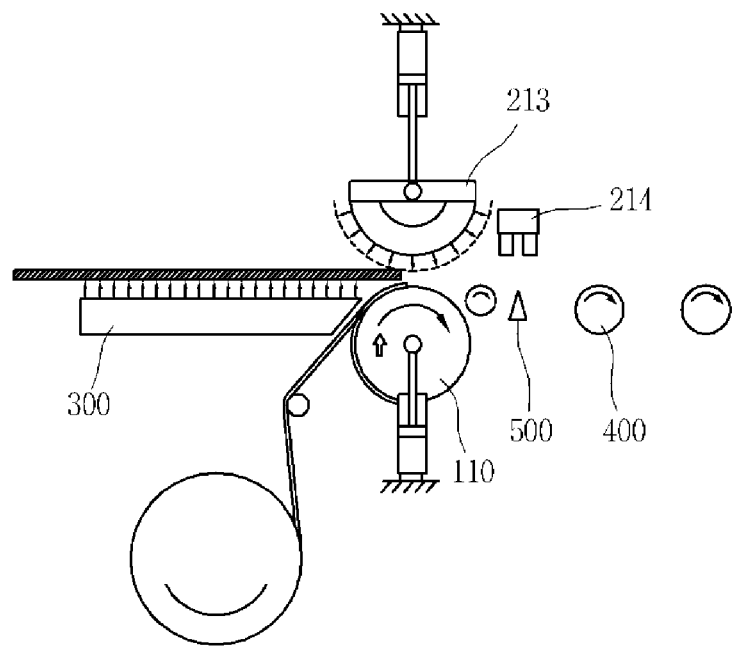
FIG. 18 to FIG. 22 schematically illustrate an eighth exemplary embodiment of the film lamination method according to the present invention.

The substrate S is floated above the B-side ultrasonic vibration unit 300 and is transported in that state to a position where the substrate S is laminated with a film F. At this time, the pressure roller 110 fixes the film F in a predetermined position using a suitable means such as a vacuum pressure. The predetermined position is set to the position in which the substrate S is laminated with the film F (FIG. 18).

Figure 19:
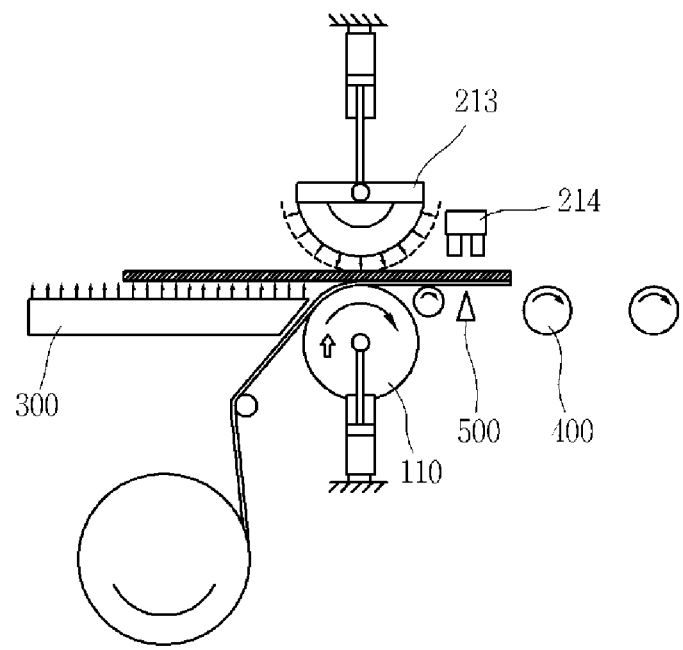

When the substrate S arrives at a position between the pressure roller 110 and the A-side ultrasonic vibration part 213, the pressure roller 110 attaches the film F to the surface of the substrate S while rotating, and the ultrasonic vibration part 213 applies repelling force to the substrate S while maintaining a predetermined distance from the substrate S (FIG. 19).

Figure 20:
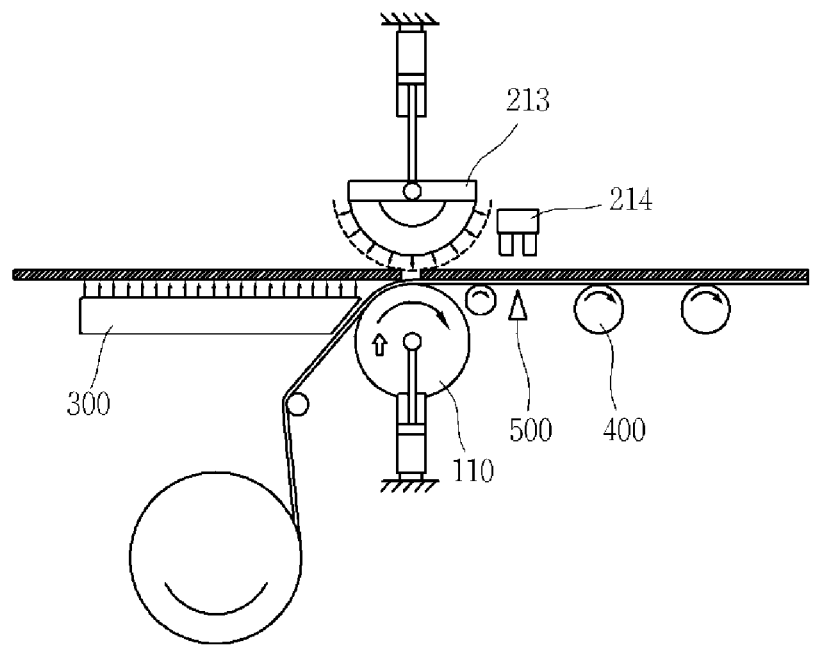
Figure 21:
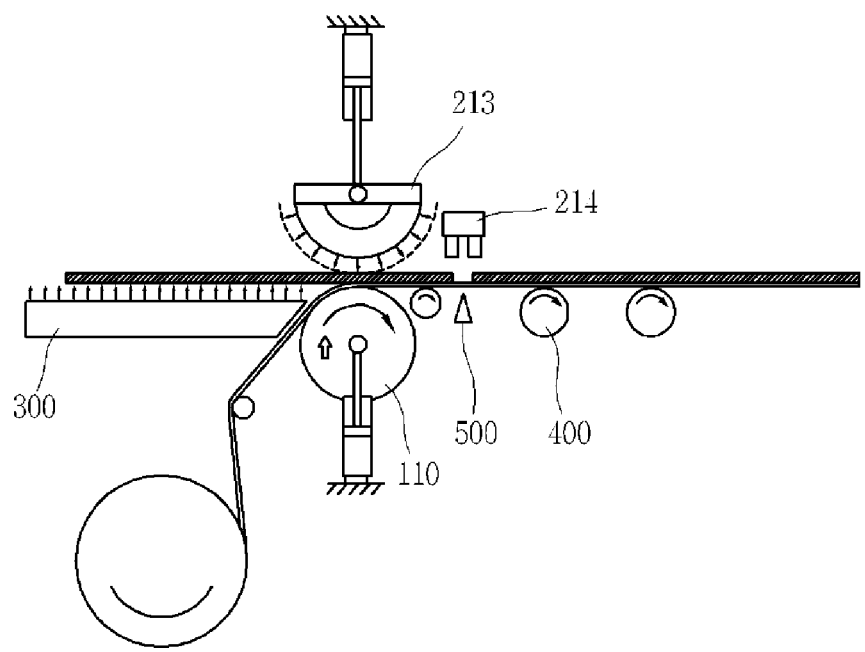

When the process of laminating one substrate S with the film F is completed, the next substrate S arrives at the position between the pressure roller 110 and the A-side ultrasonic vibration part 213 while maintaining a predetermined distance from the preceding substrate S, and the above-described lamination is carried out (FIG. 20 and FIG. 21).

Figure 22:
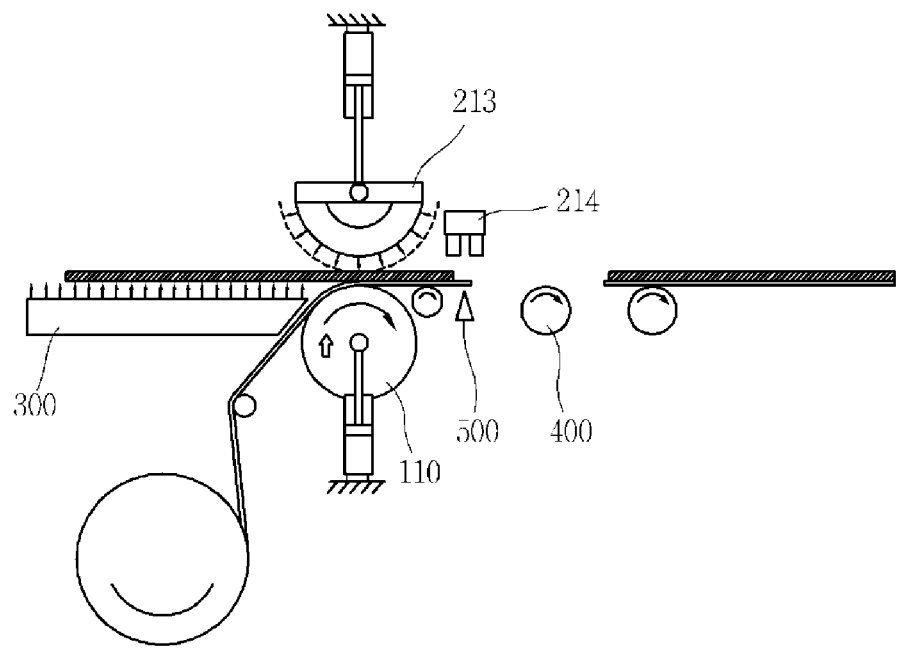

When the two substrates S are transported at the predetermined distance therebetween, the portion of the film F between the two substrates S is cut at a predetermined position using the cutting device 500 (FIG. 22).

Although it has been described herein that the substrates S are transported for the sake of explanation, it is possible to laminate the substrates S with the film F by moving the pressure roller 110 in the state in which the substrates S are set stationary.

According to the film lamination method illustrated in FIG. 21, the size of the film F is greater than the size of the substrate S laminated with the film F. In order to set the size of the film F to be smaller than the size of the substrate S laminated with the film F, the cutting device may be disposed at a position facing the outer circumference of the pressure roller 110.

Figure 23:
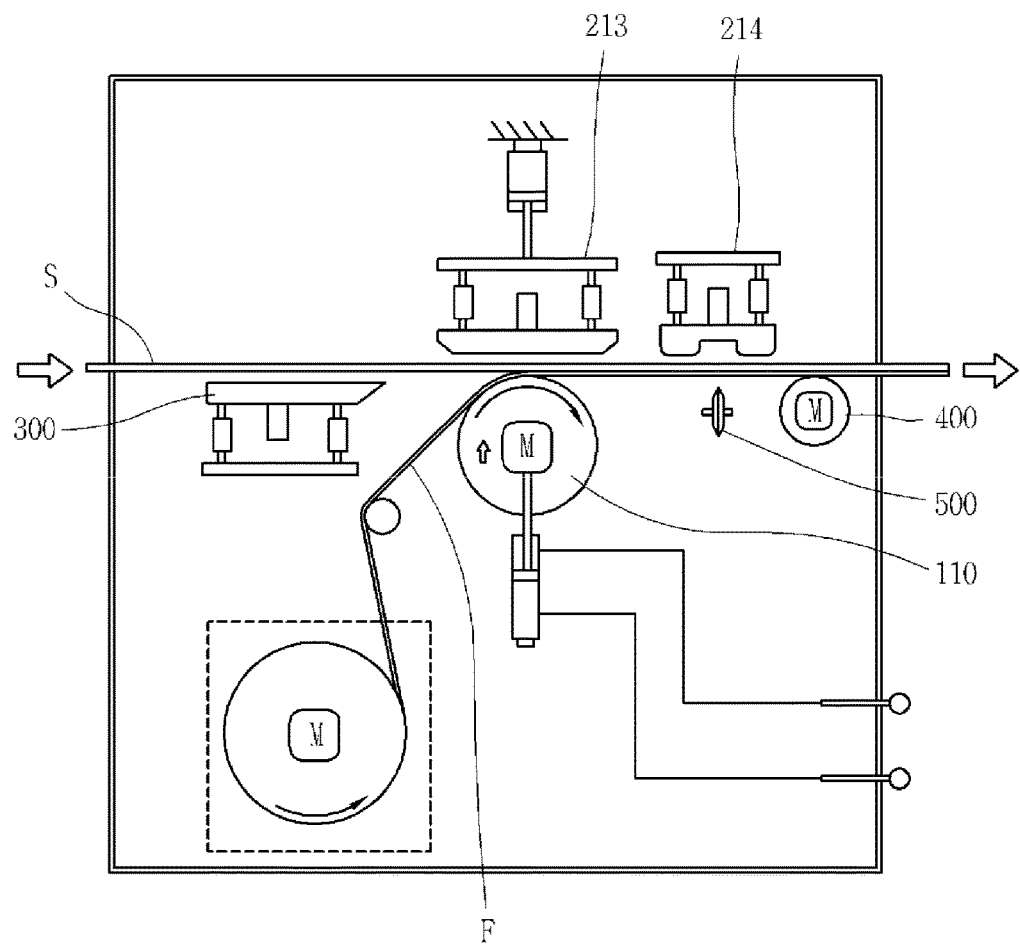
FIG. 23 schematically illustrates a ninth exemplary embodiment of the film lamination method according to the present invention.

FIG. 23 schematically illustrates a ninth exemplary embodiment of the film lamination method according to the present invention.

The ultrasonic vibration parts of the ultrasonic vibration unit may have a variety of shapes such as an arc, a circle and a flat table. The ultrasonic vibration part 213 in the shape of a flat table may facilitate the alignment between the pressure roller 110 and the ultrasonic vibration part 213.

The film lamination method illustrated in FIG. 16 to FIG. 23 may be used to laminate a single substrate S formed of a hard material with a film F.

Figure 24:
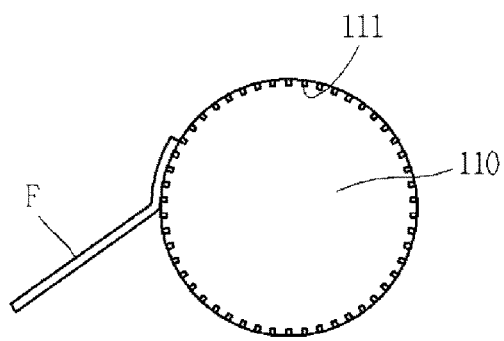
FIG. 24 and FIG. 25 schematically illustrate a process in which a film is adhered to the pressure roller in a tenth exemplary embodiment of the film lamination method according to the present invention.
Figure 25:
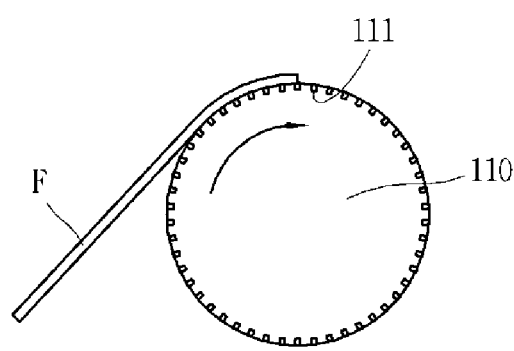

FIG. 24 and FIG. 25 schematically illustrate a process in which a film F is adhered to the pressure roller 110 in a tenth exemplary embodiment of the film lamination method according to the present invention.

The pressure roller 110 has a plurality of air suction holes 111 in the outer circumference thereof that is in contact with the film F. This configuration helps the film F in the initial attachment position come into close contact with the pressure roller 110, thereby facilitating the supply of the film F.

The foregoing descriptions of specific exemplary embodiments of the present invention have been presented with respect to the drawings. They are not intended to be exhaustive or to limit the present invention to the precise forms disclosed, and obviously many modifications and variations are possible for a person having ordinary skill in the art in light of the above teachings.

It is intended therefore that the scope of the present invention not be limited to the foregoing embodiments, but be defined by the Claims appended hereto and their equivalents.

What is claimed is:

1. A film lamination method comprising:
supporting one surface of a substrate without contact by generating ultrasonic vibrations from a first ultrasonic vibration unit and applying repelling force induced from the ultrasonic vibrations onto the one surface of the substrate; and
simultaneously laminating the other surface of the substrate with a film by pressing the film against the other surface of the substrate using a pressure roller,
wherein the substrate comprises a flexible substrate, the pressure roller presses the substrate laminated with the film under a pressure by which a curvature of the one surface of the substrate becomes positive, and at least one portion of a surface of the first ultrasonic vibration unit facing the substrate has a curvature corresponding to the positive curvature of the substrate.

2. The film lamination method according to claim 1, wherein the first ultrasonic vibration unit comprises a first ultrasonic vibration part disposed upstream of the pressure roller and a second ultrasonic vibration part disposed downstream of the pressure roller.

3. The film lamination method according to claim 1, wherein the first ultrasonic vibration unit comprises a third ultrasonic vibration part disposed at a position facing the pressure roller such that the substrate is positioned between the third ultrasonic vibration part and the pressure roller.

4. The film lamination method according to claim 1, comprising supporting the other surface of the substrate without contact by generating ultrasonic vibrations from a second ultrasonic vibration unit disposed upstream of the pressure roller and applying repelling force induced from the ultrasonic vibrations from the second ultrasonic vibration unit onto the other surface of the substrate.

5. The film lamination method according to claim 1, comprising transporting the substrate through contact with the film attached to the other surface of the substrate using a transportation roller disposed downstream of the pressure roller.

6. The film lamination method according to claim 1, comprising supplying the film to the other surface of the substrate by unwinding the film from an unwinding roll.

7. The film lamination method according to claim 1, comprising unwinding the substrate from an unwinding roll, and after the substrate is laminated with the film, winding the substrate on a winding roll.

8. The film lamination method according to claim 1, wherein the pressure roller has a plurality of air suction holes in an outer circumference thereof that comes into contact with the film.

9. The film lamination method according to claim 1, comprising cutting the film using a cutting device disposed downstream of the pressure roller at a position facing the other surface of the substrate.

10. The film lamination method according to claim 9, wherein the first ultrasonic vibration unit comprises a fourth ultrasonic vibration part disposed at a position facing the cutting device such that the substrate is positioned between the fourth ultrasonic vibration part and the cutting device.

11. The film lamination method according to claim 1, wherein the substrate comprises a glass substrate.

12. The film lamination method according to claim 1, wherein the first ultrasonic vibration unit comprises an ultrasonic vibrator facing the one surface of the substrate and an ultrasonic wave generator to vibrate the ultrasonic vibrator.

13. The film lamination method according to claim 1, comprising:
   applying a constant force to the first ultrasonic vibration unit using a first force applying unit in a direction toward the substrate; and
   applying a constant force to the pressure roller using a second force applying unit in a direction toward the substrate.

14. A film lamination apparatus comprising:
   an ultrasonic vibration unit supporting one surface of a substrate without contact by applying repelling force induced from ultrasonic vibrations onto the one surface of the substrate; and
a pressure roller laminating the other surface of the substrate with a film by pressing the film against the other surface of the substrate,
   wherein the substrate comprises a flexible substrate, the pressure roller presses the substrate laminated with the film under a pressure by which a curvature of the one surface of the substrate becomes positive, and at least one portion of a surface of the first ultrasonic vibration unit facing the substrate has a curvature corresponding to the positive curvature of the substrate.

\* \* \* \* \*